(12) United States Patent
Senshu et al.

(10) Patent No.: US 6,771,880 B1
(45) Date of Patent: *Aug. 3, 2004

(54) RECORDING/REPRODUCING COMPRESSED DIGITAL DATA RECORDED IN SEPARATE SECTORS IN A TRACK

(75) Inventors: Yoichiro Senshu, Kanagawa (JP); Yasuhiro Higashio, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/543,163

(22) Filed: Apr. 4, 2000

(30) Foreign Application Priority Data

Apr. 6, 1999 (JP) .......................................... 11-098534

(51) Int. Cl.[7] .......................... G11B 27/00; H04N 5/93; H04N 5/91; H04N 7/04; H04N 7/06; H04N 7/08; H04N 7/52

(52) U.S. Cl. ........................... 386/54; 386/96; 386/104

(58) Field of Search ............................... 386/7, 40, 68, 386/81, 124, 96, 104, 54; 360/40, 48

(56) References Cited

U.S. PATENT DOCUMENTS

| | | | |
|---|---|---|---|
| 5,377,051 A | | 12/1994 | Lane et al. |
| 5,583,707 A | * | 12/1996 | Seki .............................. 360/48 |
| 5,680,266 A | * | 10/1997 | Park .............................. 360/48 |
| 5,712,946 A | * | 1/1998 | Yanagihara .................... 386/68 |
| 5,719,721 A | * | 2/1998 | Iizuka et al. ................ 360/72.2 |
| 5,724,470 A | * | 3/1998 | Kanota et al. ................... 386/9 |
| 5,724,474 A | * | 3/1998 | Oguro et al. ................... 386/95 |
| 5,844,739 A | * | 12/1998 | Mizushima et al. ........... 360/48 |
| 6,658,195 B1 | * | 12/2003 | Senshu et al. ................. 386/54 |

FOREIGN PATENT DOCUMENTS

EP        0 712 127        5/1996

OTHER PUBLICATIONS

Patent Abstracts of Japan, vol. 1996, No. 02, Feb. 29, 1996 & JP 07 284051 A (Matsushita Electric Ind Co Ltd), Oct. 27, 1995.

* cited by examiner

*Primary Examiner*—Thai Tran
*Assistant Examiner*—Polin Chieu
(74) *Attorney, Agent, or Firm*—Frommer Lawrence & Haug LLP; William S. Frommer

(57) ABSTRACT

In a recording and reproduction method for recording compressed digital data on magnetic tape by a helical scanning method or for reproducing compressed digital data recorded on magnetic tape by the helical scanning method, a first recording area, including an audio sector, and a second recording area, including a track-synchronization-information sector, a video sector or a video-and-audio-mixed sector in which audio data and video data are mixed, a sub-code sector, and a search-data sector in which data used in variable-speed reproduction is recorded, are sequentially disposed in the direction from the top to the end of each track on the magnetic tape with an interference area disposed therebetween. Data is continuously recorded in each sector in the first recording area and the second recording area. In the second recording area, the sub-code sector or the search-data sector is disposed after the video sector or the video-and-audio-mixed sector.

4 Claims, 6 Drawing Sheets

AUDIO ········· AUDIO SECTOR
ITI ············ TRACK-SYNCHRONIZATION-INFORMATION SECTOR
AUDIO-VIDEO ···· VIDEO-AND-AUDIO-MIXED SECTOR
SUB-CODE ······· SUB-CODE SECTOR
SEARCH ········· SEARCH-DATA SECTOR

SUB-CODE

SUB-CODE

RECORDING/REPRODUCING COMPRESSED DIGITAL DATA RECORDED IN SEPARATE SECTORS IN A TRACK

BACKGROUND OF THE INVENTION

1. Field of the Invention

The present invention relates to magnetic recording and reproduction apparatuses and methods therefor, and more particularly, to a magnetic recording and reproduction apparatus and a method therefor, in which digital data is recorded by a helical scanning method or reproduced.

2. Description of the Related Art

Portable digital video tape recorders including cameras (digital camcorders) and installation-type digital video tape recorders have been available these days, which are recording and reproduction apparatuses for recording digital video signals and digital audio signals into magnetic tape.

As a recording method for the above digital video tape recorders, a so-called DV method (IEC 61834 Helical scan digital video tape cassette recording system using 6.35 mm magnetic tape for consumers—525/60, 625/50, 1125/60, and 1250/50 systems) is used. The assignee of the present invention has filed two related applications (U.S. Pat. No. 5,926,604 and U.S. Pat. No. 6,028,726).

In the DV method, video tape 6.35 mm (=¼ inches) wide is used, which is narrower than video tape used in related analog video tape recorders by their recording methods, such as an 8-mm method (IEC 60843 Helical scan video tape cassette recording system using 8 mm magnetic tape for consumers).

In the DV method, although the tape width is smaller than that conventionally used, since a signal to be recorded is compressed and a recording density is increased, the DV method allows higher-quality recording for a longer period than recording methods for related analog video tape recorders.

FIG. 4 shows a track structure in the DV method. From the top of a track, an insert-and-track-information (ITI) sector serving as a time-axis reference during so-called after recording, an interference area (ITG: inter-track gap) (GAP), an audio (Audio) sector, another interference area (GAP), a video (Video) sector, yet another interference area (GAP), and a sub-code (Sub-code) sector are sequentially disposed.

In the DV method, one frame of a video signal conforming to the NTSC system is recorded into each of a total of 10 (12 for PAL) tracks. This means that a track has a constant relationship with a frame.

Therefore, when a desired video (frame) is searched for by fast forwarding magnetic tape while video is viewed, namely, during a variable-speed reproduction using a so-called search function, for example, since a track has a constant relationship with a frame, even if reproduction starts at any position in magnetic tape, video can be displayed after data is read from a predetermined number of tracks, and it is very easy to identify the position of the desired frame in the magnetic tape.

In a method for recording digital data which includes a video signal and an audio signal compressed by the MPEG-2 method, for example, since a track does not have a constant relationship with a frame due to the characteristics of the compression process, it is difficult to identify the position of a desired frame in magnetic tape. In addition, when reproduction starts at any position in the magnetic tape, if all of one frame of a video signal is not recorded at the position, video cannot be displayed.

In the method for recording digital data which includes a video signal and an audio signal compressed by the MPEG-2 method, it is known that data especially for variable-speed reproduction, such as for searching, namely, search data, is recorded in each track of magnetic tape together with other types of data.

Depending on a position where search data is recorded on a track, however, the following problem arises.

An RF output obtained from each track differs between a normal reproduction mode (FWD) and a variable-speed reproduction mode, such as a high-speed reproduction mode (Cue & review) and a fast-forward or rewinding reproduction mode (FF & rewind) as shown in FIGS. 5 to 7. In FWD, a successful RF level is maintained at both starting position and ending position of a head in a track, whereas an RF output deteriorates at the start position of the head in a track where a rotating drum provides a thick air film in Cue & review (at about a speed five times to 30 times the normal reproduction speed). In FF & rewind (at about a speed 30 times to 200 times the normal reproduction speed), an RF output deteriorates near the ending position of a head in a track as well as the starting position in the track.

Therefore, in the DV method, for example, since position information (such as a track number) to be referenced during FF & rewind on the magnetic tape is recorded in the sub-code (Sub-code) sector, which is located near the ending position of a head in a track as shown in FIG. 4, it is difficult to obtain a necessary RF output.

When a non-standard signal (a signal output from a video-game unit or an analog-type recording and reproduction apparatus during a variable-speed reproduction, in which the time axis shifts from the standard of the NTSC system or the PAL system) is recorded by a digital-type recording and reproduction apparatus, if the rotation of a rotating drum tracks the non-standard signal, the length of each track into which digital data having a constant clock frequency is recorded may be extended or contracted.

As shown in FIG. 8, if the length of a track is extended, since the ending position of the head in the track shifts, data may be recorded into an area where an RF output characteristic is not assured on magnetic tape.

This issue is likely to affect especially methods in which a sub-code (Sub-code) sector is located near the ending position of a head in a track, such as the DV method. If data recorded into the sub-code (Sub-code) sector cannot be read, the destination is not identified in searching, causing a problem in the operations of the apparatus.

SUMMARY OF THE INVENTION

Accordingly, it is an object of the present invention to improve RF and search characteristics when data dedicated to variable-speed reproduction, such as a search, namely, search data, is recorded into magnetic tape, in a magnetic recording and reproduction apparatus and a method therefor in which compressed digital data is recorded into the magnetic tape by a helical scanning method or compressed digital data recorded into the magnetic tape by the helical scanning method is reproduced.

The foregoing object is achieved in one aspect of the present invention through the provision of a recording and reproduction method for recording compressed digital data on magnetic tape by a helical scanning method or for reproducing compressed digital data recorded on magnetic tape by the helical scanning method, including the steps of disposing sequentially in the direction from the top to the end of each track on the magnetic tape a first recording area, including an audio sector, and a second recording area, including a track-synchronization-information sector, a video sector or a video-and-audio-mixed sector in which audio data and video data are mixed, a sub-code sector, and a search-data sector in which data used in variable-speed reproduction is recorded, with an interference area disposed therebetween; recording data continuously in each sector in the first recording area and the second recording area; and disposing the sub-code sector or the search-data sector after the video sector or the video-and-audio-mixed sector in the second recording area.

Since the sub-code sector or the search-data sector is disposed at a position where a successful RF output characteristic is obtained in each track, the RF characteristic and that in the variable-speed reproduction are maintained at a successful level.

The foregoing object is achieved in another aspect of the present invention through the provision of recording and reproduction apparatus for recording compressed digital data on magnetic tape by a helical scanning method or for reproducing compressed digital data recorded on magnetic tape by the helical scanning method, including recording means for disposing sequentially in the direction from the top to the end of each track on the magnetic tape a first recording area, including an audio sector, and a second recording area, including a track-synchronization-information sector, a video sector or a video-and-audio-mixed sector in which audio data and video data are mixed, a sub-code sector, and a search-data sector in which data used in variable-speed reproduction is recorded, with an interference area disposed therebetween, and for recording data continuously in each sector in the first recording area and the second recording area, wherein the sub-code sector or the search-data sector is disposed after the video sector or the video-and-audio-mixed sector in the second recording area.

Since the sub-code sector or the search-data sector is disposed at a position where a successful RF output characteristic is obtained in each track, the RF characteristic and that in the variable-speed reproduction are maintained at a successful level.

The video sector or the video-and-audio-mixed sector, the sub-code sector, and the search-data sector may be disposed in that order in the second recording area in the direction from the top to the end of each track. In this case, data required for variable-speed reproduction is collectively disposed at the ending position (the last reading portion) of the head in a recording track, where a rotating drum provides a thin air film and a stable RF output is obtained. Therefore, the RF characteristic and that in the variable-speed reproduction are maintained at an extremely successful level.

BRIEF DESCRIPTION OF THE DRAWINGS

FIGS. 1 to 3 show a magnetic recording and reproduction apparatus and a method therefor according to an embodiment of the present invention.

FIG. 2 is a view showing a tape wrap angle on a rotating drum.

FIG. 3 is a view of a data pattern in a track.

FIGS. 5 to 8 show a problem during variable-speed reproduction in a related tape format.

FIG. 6 is a view of an RF waveform during a high-speed reproduction mode (Cue & review).

FIG. 7 is a view of an RF waveform during a fast-forward or rewinding reproduction mode (FF & rewind).

FIG. 8 a view of an RF waveform during recording of a non-standard signal.

DESCRIPTION OF THE PREFERRED EMBODIMENT

Figure 1:
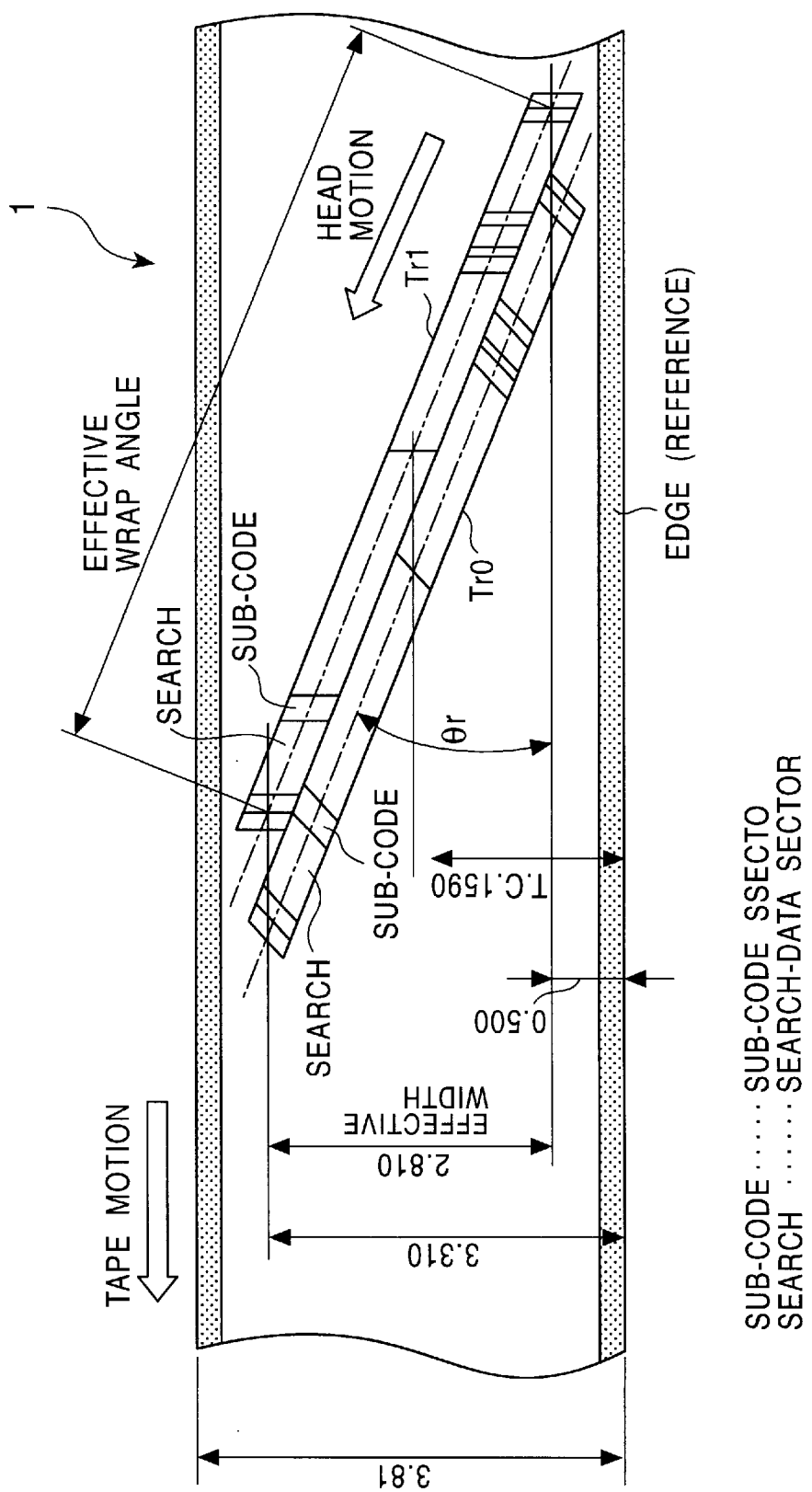
FIG. 1 is a view of a track pattern on magnetic tape.

A magnetic recording and reproduction apparatus and a method therefor according to an embodiment of the present invention will be described below by referring to the attached drawings.

The following embodiment describes a case in which the present invention is applied to a magnetic recording and reproduction method for recording and reproducing digital data compressed by the Moving Picture Experts Group (MPEG) 2 method or the like into and from magnetic tape 3.81 mm (=3/20 inches) wide, and is also applied to a magnetic recording and reproduction apparatus using the magnetic recording and reproduction method.

In a magnetic recording and reproduction method according to the present invention, compressed digital data is recorded into magnetic tape by a helical scanning method or compressed digital data recorded into magnetic tape by the helical scanning method is reproduced. In each track on the magnetic tape, there are sequentially disposed in the direction from the top to the end of each track a first recording area which includes an audio sector, and a second recording area which includes a track-synchronization-information sector, a video sector or a video-and-audio-mixed sector in which audio data and video data are mixed, a sub-code sector, and a search-data sector in which data used during a variable-speed reproduction is recorded, with an interference area disposed therebetween. Data is continuously recorded in each sector in the first and second recording areas. In the second recording area, the sub-code sector or the search-data sector is disposed after the video sector or the video-and-audio-mixed sector.

In a magnetic recording and reproduction apparatus according to the present invention, compressed digital data is recorded into magnetic tape by a helical scanning method or compressed digital data recorded into magnetic tape by the helical scanning method is reproduced. The magnetic recording and reproduction apparatus is provided with recording means for sequentially disposing in each track on the magnetic tape in the direction from the top to the end of each track a first recording area which includes an audio sector, and a second recording area which includes a track-synchronization-information sector, a video sector or a video-and-audio-mixed sector in which audio data and video data are mixed, a sub-code sector, and a search-data sector in which data used during a variable-speed reproduction is recorded, with an interference area disposed therebetween; and for continuously recording data in each sector of the first and second recording areas. In the second recording area, the sub-code sector or the search-data sector is disposed after the video sector or the video-and-audio-mixed sector.

The following Table 1 indicates parameters used in a magnetic recording and reproduction method (hereinafter called the present format) according to the present invention, for recording and reproducing digital data compressed by the MPEG-2 method or the like into and from magnetic tape 3.81 mm (=3/20 inches) wide, and also used in a magnetic recording and reproduction apparatus employing the present format.

TABLE 1

| Parameters | Values |
| --- | --- |
| Diameter of rotating drum | 21.7 mm |
| Speed of rotating drum | 6,480 rpm |
| Track count per one rotation of rotating drum | 1 |
| Lead angle of rotating drum | 5.067 degrees |
| Recording-track angle (θr) | 5.0704 degrees |
| Track pitch | 4.0 μm |
| Tape speed | 4.888 mm/sec |
| Relative speed | 7.358 m/sec |
| Recording rate | 51.516 Mbps |
| Recording density on actual surface | 1.129 Gbpi$^2$ |
| Recording density on source surface | 1.004 Gbpi$^2$ |
| Minimum recording wavelength | 0.286 μm |
| Effective track length | 31.793 mm |
| Sync lag | 6.127 μs |
| Tr0 azimuth angle | −20 or 25 |
| Tr1 azimuth angle | +20 or 25 |
| Effective wrap angle | 168 degrees |
| Tape width | 3.81 mm |
| Effective-area starting height | 0.5 mm |
| Track-center height | 1.590 mm |

FIG. 1 shows a track pattern used when a digital signal is recorded into magnetic tape 1 having a tape width of 3.81 mm, which is used in the present format.

As shown in Table 1 and FIG. 1, in the present format, a video signal and an audio signal are recorded into tracks Tr0 and Tr1 alternately by two heads provided for a rotating drum 2 having a diameter of 21.7 mm which rotates 6,480 rpm against the magnetic tape 1, per one rotation of the rotating drum 2.

In other words, the rotating drum 2 is provided, for example, with two magnetic heads having different azimuth angles, disposed at positions 180 degrees apart. These two magnetic heads scan the magnetic tape 1 at a predetermined angle (θr=5.07036 degrees) against the running direction of the magnetic tape 1 to form the track pattern shown in FIG. 1.

Figure 2:
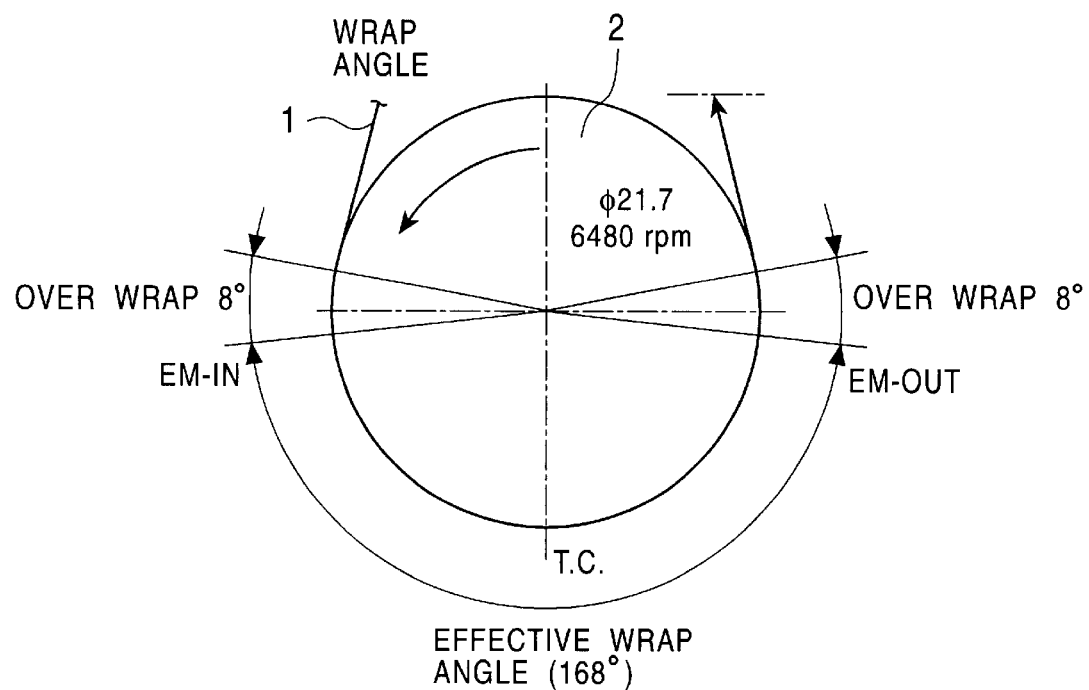

FIG. 2 shows a tape wrap angle on the rotating drum 2 in the present format.

In the present format, the magnetic tape 1 is wound on the rotating drum 2 at an angle of 168 degrees, as shown in FIG. 2. A signal is recorded into one track on the magnetic tape 1 when one magnetic head moves within a tape wrap angle of 168 degrees.

During data recording, a head used for recording data is changed every time the rotating drum 2 rotates by 360 degrees. More specifically, for example, one head records data into the track Tr0 at a first rotation of the rotating drum 2 and the other head having a different azimuth angle records data into the track Tr1 at the next rotation.

During data reproduction, the two heads always reproduce RF data per one rotation of the rotating drum 2. This is called a double-density reproduction (so-called non-tracking) method. According to this method, since data is reproduced from one track by the two heads with a slight shift, it is advantageous that a compatibility problem caused by a track curve is eased.

Figure 3:
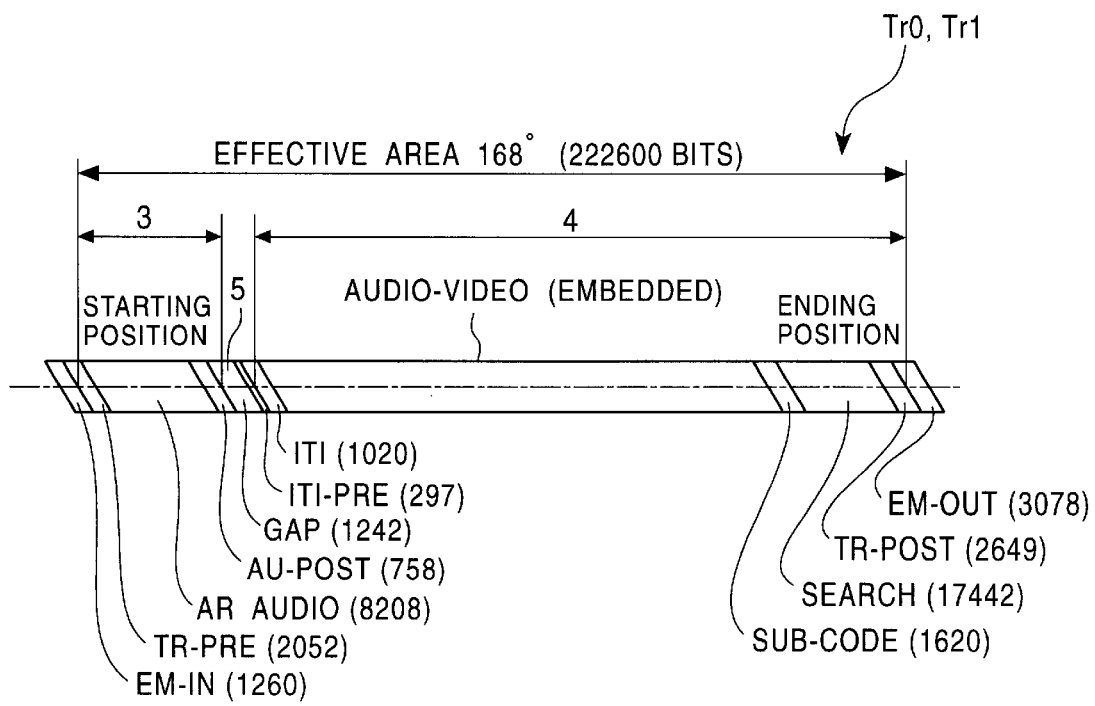
Figure 4:
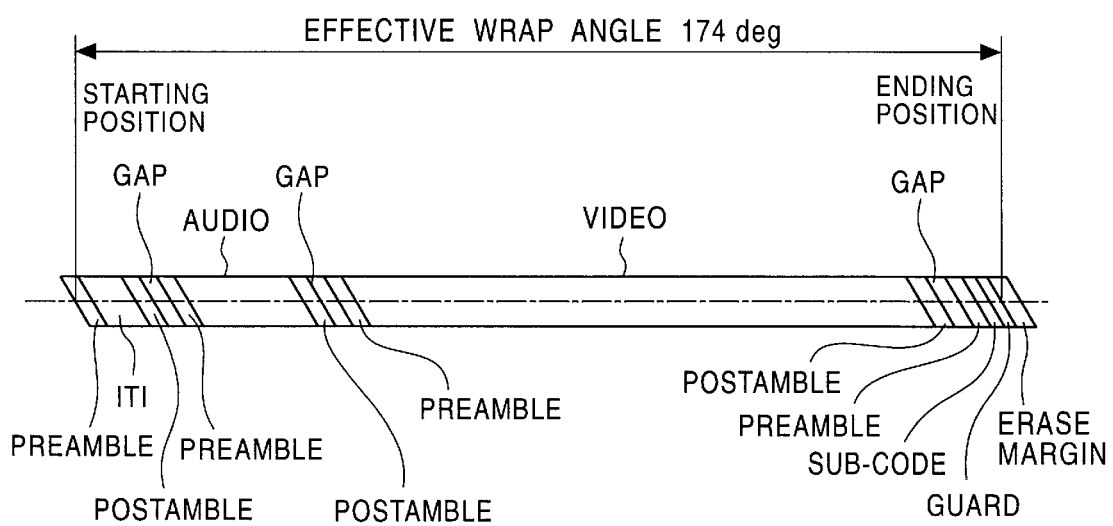
FIG. 4 is a view of a data pattern in a track in a related recording method (DV method).
Figure 5:
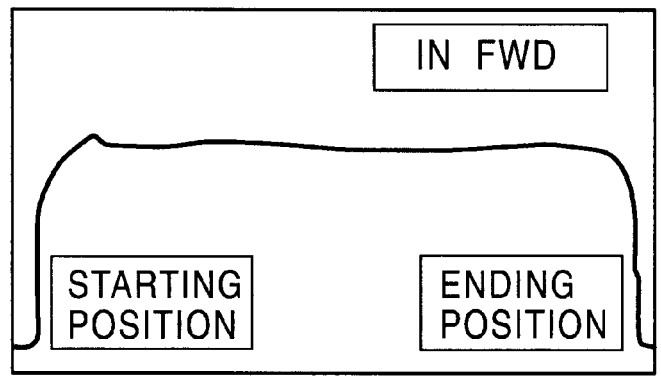
FIG. 5 is a view of an RF waveform during a normal reproduction mode (FWD).
Figure 6:
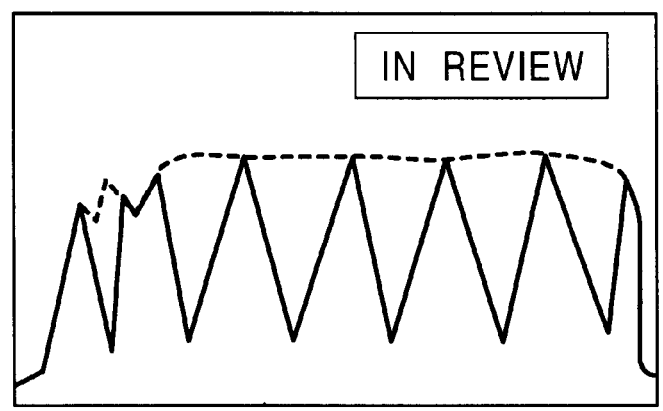
Figure 7:
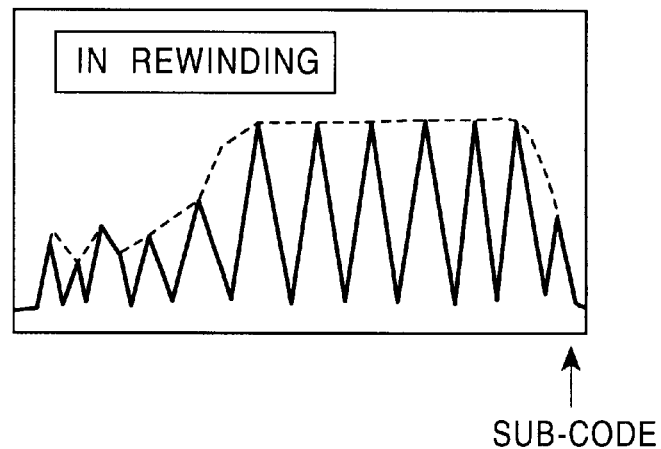
Figure 8:
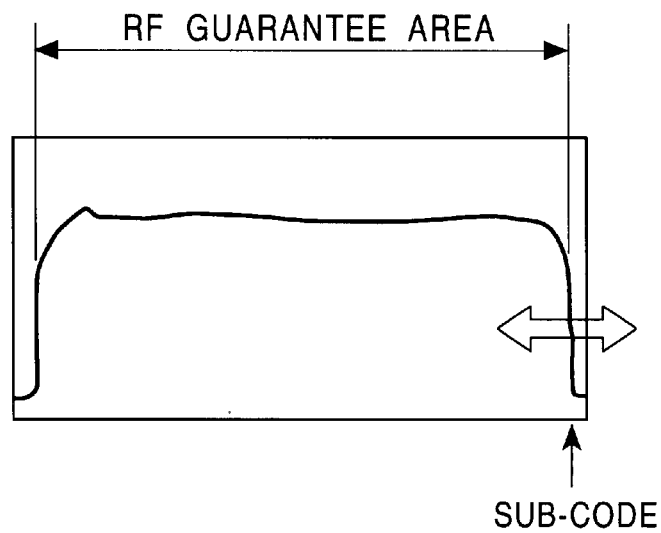

FIG. 3 shows a data pattern in the track Tr0 or Tr1 in the present format.

In the present format, an effective wrap angle is 168 degrees as shown in FIG. 1 and FIG. 3. Within this effective wrap angle, the first recording area (sub area) 3 having 11,016 bits, the second recording area (main area) 4 having 210,342 bits, and the interference area (GAP) 5 having 1,242 bits sandwiched thereby are disposed.

At the pre-stage and the post-stage of the effective wrap angle, an erase-margin-in (Em-in) sector having 1,260 bits and an erase-margin-out (Em-out) sector having 3,078 bits are disposed as erase margins.

The first recording area 3 includes sectors from the starting position of a head (in the direction from the top to the end) in a track in the order of a track-pre-amble (Tr-pre) sector having 2,053 bits, an audio (Audio) sector having 8,208 bits for after recording, and an audio-post-amble (Audio-post) sector having 756 bits, as shown in FIG. 3.

The second recording area 4 includes sectors from the starting position of a head in a track in the order of an ITI-pre-amble (ITI-pre) sector having 297 bits, a track-synchronization-information (ITI) sector having 1,620 bits, a video-and-audio-mixed (Audio-Video (Embedded)) sector having 186,714 bits, in which video data and audio data are mixed, a sub-code (Sub-code) sector having 1,620 bits, a search-data (Search) sector having 17,442 bits, in which data used during a variable-speed reproduction is recorded, and a track-post-amble (Tr-post) sector having 2,649 bits.

A feature of the track pattern on the magnetic tape 1 in the present format is that, as an interference area in which actual data is not recorded, only the interference area 5 is provided between the first recording area 3 and the second recording area 4, and an interference area is not provided for portions such as that between the video-and-audio-mixed (Audio-Video) sector and the sub-code (Sub-code) sector.

Therefore, the rate of the interference area 5 to the effective data zone in one track, the effective data zone being formed of the track-pre-amble (Tr-pre) sector, the audio (Audio) sector, the audio-post-amble (Audio-post) sector, the interference area 5, the ITI-pre-amble (ITI-pre) sector, the track-synchronization-information (ITI) sector, the video-and-audio-mixed (Audio-Video) sector, the sub-code (Sub-code) sector, and the track-post-amble (Tr-post) sector, is about 0.6% (1062/230550≅0.005), which is extremely smaller than the corresponding value in the DV method, about 2%. This means that the data area on the magnetic tape is more efficiently used in the present format.

To reduce the rate of the interference area, which is not an effective data area in one track, as much as possible, the following configuration is used in the present format.

For after recording into the audio (Audio) sector, the track-synchronization-information (ITI) sector, which serves as a time-axis reference for after recording, is placed at the subsequent side of the audio (Audio) sector and the timing obtained by the previous head scanning is stored and accumulated to adjust the timing for after recording into the audio (Audio) sector. Therefore, it is unnecessary to place an interference area between the track-synchronization-information (ITI) sector and the video-and-audio-mixed (Audio-Video) sector.

In the present format, after recording is not performed in the sub-code (Sub-code) sector. A time code and additional data obtained during the original data recording are recorded into the sub-code sector and a location during search is read therefrom. A marker used for later rewriting is stored, for example, in a memory provided for the cassette of the magnetic tape 1. Therefore, an interference area conventionally disposed between the video-and-audio-mixed (Audio-Video) sector and the sub-code sector can be removed.

Another feature of the track pattern on the magnetic tape 1 in the present format is that data is continuously recorded into the sub-code (Sub-code) sector and the search-data (Search) sector after the video-and-audio-mixed (Audio-Video) sector in the second recording area 4.

As described before, video cannot be displayed during a variable-speed reproduction by the use of data compressed by the MPEG-2 method or the like, recorded into the video-and-audio-mixed (Audio-Video) sector, data (mainly video data) used during variable-speed reproduction is recorded in the search-data (Search) sector.

Since the sub-code sector needs to be read during variable-speed reproduction of the magnetic tape 1, it is disposed near the ending position of the head in a track, where an RF output is stable and the rotating drum 2 produces a thin air film even in a variable-speed reproduction, in which the magnetic tape 1 runs fast.

The audio (Audio) sector for after recording is disposed near the starting position of the head in a track, where an RF output tends to be unstable during variable-speed reproduction. This is because it is not necessary to output audio during variable-speed reproduction.

The erase margin sectors Em-in and Em-out are provided at the pre-stage and the post-stage of the effective wrap angle, namely, at the starting position and the ending position of the head in a track to prevent, when data is written into a track where another data has been recorded, previous data from remaining due to the positional shift of the track.

Various reproduction modes for the magnetic tape 1 where data is recorded by the present format, and sectors required for each of the various reproduction modes will be described below.

In the normal reproduction (FWD) mode, all sectors except the search-data (Search) sector are needed. In the high-speed reproduction (Cue & review) mode, the search-data (Search) sector, used for displaying video reproduced at a variable speed, and the sub-code (Sub-code) sector, used for obtaining a track number and a time code, are required. In the fast-forward or rewinding reproduction (FF & rewind) mode, only the sub-code (Sub-code) sector, used for obtaining a track number and a time code, is required.

In this way, sectors required for reproducing data are limited in variable-speed reproduction, namely, the high-speed reproduction mode and the fast-forward or rewinding reproduction mode.

Since the present format has the data pattern described above for tracks Tr0 and Tr1, both sub-code (Sub-code) sector and search-data (Search) sector are reproduced easily in the high-speed reproduction mode. In addition, in the fast-forward or rewinding reproduction mode, where a higher speed is used than in the high-speed reproduction mode, even if an RF signal near the ending position of the head in a track deteriorates, the deterioration of an RF output is unlikely to affect because the sub-code (Sub-code) sector, required to be reproduced, is disposed more inside.

In the normal reproduction, even if an RF signal near the ending position of the head in a track deteriorates, since search data recorded in the search-data (Search) sector disposed there is not used, video, audio, and a time code work well.

Unlike the DV method, since sub-code data is not recorded near the ending position of the head in a track, the deterioration of an RF output near the ending position does not affect in the present format. Therefore, during the fast-forward or rewinding reproduction mode, when a predetermined recording location is searched for according to sub-code data while the magnetic tape 1 is fed at a high speed, an inconvenience does not occur in which the predetermined location cannot be searched for because sub-code data cannot be read. The fast-forward or rewinding reproduction mode can be implemented at a higher speed.

Even if a track is extended because a non-standard signal is recorded and the ends (the starting and ending positions of the head) of the track exceeds a recording and reproduction area on magnetic tape, data recorded into the video-and-audio-mixed (Audio-Video) sector, which is required for various types of control in a recording and reproduction apparatus can be read in the present format, and various types of control are not affected. In the same way, since the video-and-audio-mixed (Audio-Video) sector, including video data, is disposed more inside than the video-and-audio-mixed (Audio-Video) sector in a track, it is not affected. Data recorded in the search-data (Search) sector, which is used in the high-speed reproduction mode, is affected to some extent and disturbed, but the essential function still works.

As described above in detail, according to the format used in a magnetic recording and reproduction apparatus and a method therefor of the present invention, since video data compressed by the MPEG-2 method and the like cannot reproduced during a variable-speed reproduction, the search-data section used during the variable-speed reproduction is separately provided near the ending position of the head in a recording track and the sub-code sector is also provided therebefore to enhance RF characteristics and those during the variable-speed reproduction. If this object is achieved, the order in which the sectors forming the track data pattern are arranged in a track can be modified appropriately.

Interference areas, which are ineffective data areas in a track, are reduced. The rate of interference areas to all data recording areas is about 0.6%, which is lower by 1.4% than about 2% in the DV method. Data can be recorded more.

Therefore, with the amount of data to be recorded being the same, magnetic tape used is reduced. With the same amount of magnetic tape being used, the amount of data to be recorded is increased, which can improve sound quality and image quality.

In addition, with the same amount of magnetic tape being used, since the frequency of a data recording signal can be lowered to make the minimum recording wavelength to be recorded on magnetic tape longer, a load applied to an electromagnetic transduction system, such as magnetic tape and magnetic heads, is reduced.

The arrangement order of the interference area 5 and the sectors excluding the sub-code (Sub-code) sector and the search-data (Search) sector, forming the data pattern in a track in the present format, is not limited to that described above.

The specific shape and construction of each section shown in the above embodiment merely indicate a specific example embodiment of the present invention. The technical scope of the present invention is not limited thereby.

What is claimed is:

1. A recording and reproduction method for recording compressed digital data on magnetic tape by a helical scanning method or for reproducing compressed digital data recorded on magnetic tape by the helical scanning method, comprising the steps of:

disposing sequentially in the direction from the top to the end of each track on the magnetic tape a first recording area, including an audio sector, and a second recording area, including a track-synchronization-information sector, a video sector or a video-and-audio-mixed sector in which audio data and video data are mixed, a sub-code sector, and a search-data sector in which data used in variable-speed reproduction is recorded, with an interference area disposed therebetween;

recording data continuously in each sector in the first recording area and the second recording area; and disposing the sub-code sector or the search-data sector after the video sector or the video-and-audio-mixed sector in the second recording area.

2. A magnetic recording and reproduction method according to claim 1, wherein the video sector or the video-and-audio-mixed sector, the sub-code sector, and the search-data sector are disposed in that order in the second recording area in the direction from the top to the end of each track.

3. A recording and reproduction apparatus for recording compressed digital data on magnetic tape by a helical scanning method or for reproducing compressed digital data recorded on magnetic tape by the helical scanning method, comprising:

recording means for disposing sequentially in the direction from the top to the end of each track on the magnetic tape a first recording area, including an audio sector, and a second recording area, including a track-synchronization-information sector, a video sector or a video-and-audio-mixed sector in which audio data and video data are mixed, a sub-code sector, and a search-data sector in which data used in variable-speed reproduction is recorded, with an interference area disposed therebetween, and for recording data continuously in each sector in the first recording area and the second recording area;

wherein the sub-code sector or the search-data sector is disposed after the video sector or the video-and-audio-mixed sector in the second recording area.

4. A magnetic recording and reproduction apparatus according to claim 3, wherein the video sector or the video-and-audio-mixed sector, the sub-code sector, and the search-data sector are disposed in that order in the second recording area in the direction from the top to the end of each track.

* * * * *